United States Patent
Mukai et al.

[11] Patent Number: 5,837,175
[45] Date of Patent: Nov. 17, 1998

[54] PROCESS FOR PRODUCING ARTIFICIAL MARBLE HAVING STRIPED PATTERN

[75] Inventors: Nobuhiro Mukai; Masaaki Shibazaki, both of Toyama, Japan

[73] Assignee: Du Pont-MRC Co., Ltd., Tokyo, Japan

[21] Appl. No.: 954,229

[22] Filed: Oct. 20, 1997

[30] Foreign Application Priority Data

Oct. 29, 1996 [JP] Japan .................................. 8-286834

[51] Int. Cl.$^6$ .................................................. B29C 39/12
[52] U.S. Cl. ............................................. 264/73; 264/245
[58] Field of Search ........................................ 264/73, 245

[56] References Cited

U.S. PATENT DOCUMENTS

| | | | |
|---|---|---|---|
| 503,661 | 8/1893 | Gnuchtel | 264/73 |
| 3,761,554 | 9/1973 | Barnette | 264/69 |
| 3,832,264 | 8/1974 | Barnette . | |
| 4,378,387 | 3/1983 | Mitchell | 427/263 |
| 4,721,634 | 1/1988 | McKinnon . | |
| 5,266,253 | 11/1993 | Dijkhuizen et al. . | |
| 5,576,031 | 11/1996 | Uchida et al. | 425/130 |
| 5,624,510 | 4/1997 | Uchida et al. | 156/62.2 |
| 5,698,032 | 12/1997 | Weis | 118/402 |

FOREIGN PATENT DOCUMENTS

| | | |
|---|---|---|
| 0 164 847 | 12/1985 | European Pat. Off. . |
| 0 526 818 | 2/1993 | European Pat. Off. . |
| 0 667 249 | 8/1995 | European Pat. Off. . |
| 279 214 | 5/1990 | German Dem. Rep. . |

OTHER PUBLICATIONS

Patent Abstracts of Japan, vol. 014, No. 121 (M–0946), 7 Mar. 1990 & JP 01 317723 A (Toto Ltd.), 22 Dec. 1989 *Abstract; Figures*.

Patent Abstracts of Japan, vol. 006, No. 065 (M–124), 24 Apr. 1982 & JP 57 006718 A (Toto Ltd.), 13 Jan. 1982, *Abstract; Figures*.

*Primary Examiner*—Jan H. Silbaugh
*Assistant Examiner*—Suzanne E. Mason
*Attorney, Agent, or Firm*—Oblon, Spivak, McClelland, Maier & Neustadt, P.C.

[57] ABSTRACT

A process for producing artificial marble by curing liquid resins in a molding cell, which comprises a step in which liquid resins each having different color are laminated by injection in the molding cell so that at least two layers are formed, then a comb-like tool is moved in the liquid resins laminated while the blades of the tool are in contact with the bottom of the molding cell to produce a striped pattern formed from at least the liquid resin of a layer which is adjacent a bottom layer and which flows to the bottom of the molding cell, and then the liquid resins are cured to produce artificial marble having a striped pattern

5 Claims, 1 Drawing Sheet

PROCESS FOR PRODUCING ARTIFICIAL MARBLE HAVING STRIPED PATTERN

BACKGROUND OF THE INVENTION a. Field of the Invention:

The present invention relates to a process for producing artificial marble having a striped pattern.

b. Description of the Prior Art:

Artificial marble has been conventionally produced for use as a counter of a wash stand or a table top by curing a liquid resin. As a method for producing such artificial marble having a pattern on the surface thereof, there are known methods in which when a liquid resin is injected in a molding cell, a synthetic resin material having different color is mixed, in Japanese Patent Publication (JP-B) No.59 (1984)-1568 and Japanese Patent Laid-Open (JP-A) No. 1(1989)-317723.

However, by these conventional methods, there are problems that the reproducibility of pattern manifestation is not obtained and the yield of a product is low. Further, artificial marble is often subjected to grinding process of the surface thereof for use, and it is required that the pattern on the surface is maintained in the process, however, in many cases, the pattern disappears or varies much by the grinding. Moreover, when an extraneous material is used for the manifestation of a pattern, differences in curing speed and physical properties easily occur between the extraneous material and a base resin material. Therefore, the resultant artificial marble having a pattern sometimes has lower mechanical properties as artificial marble as compared with one having no pattern.

SUMMARY OF THE INVENTION

The object of the present invention is to provide a process for producing artificial marble which can form a striped pattern having clear and natural appearance by a simple method and which can easily control this pattern.

Another object of the present invention is to provide a process for producing artificial marble which can form a striped pattern which does not disappear even when the surface thereof is ground since the pattern is formed also along the thickness direction thereof continuously.

The above-described objects of the present invention are attained by a process for producing artificial marble by curing liquid resins in a molding cell, which comprises a step in which liquid resins each having different color are laminated by injection in the molding cell so that at least two layers are formed, then a comb-like tool is moved in the liquid resins laminated while the blades of the tool being contacted with the bottom of the molding cell to produce artificial marble having a striped pattern.

According to the production process of the present invention, a striped pattern having clear and natural appearance can be formed by a simple method. Since this striped pattern is formed also along the thickness direction of the artificial marble, even if the surface of the artificial marble is ground, the pattern does not disappear and the same striped pattern can be manifested also in the ground part. The width and spreading direction of the striped pattern can be regulated by controlling the moving direction of the blades and the shape of the blade of the comb-like tool. Further, since the composition of the striped part of the artificial marble can be almost the same as that of the base part, there is no reduction in mechanical physical properties of the artificial marble by forming the pattern.

DESCRIPTION OF THE PREFERRED EMBODIMENTS

Figure 1:
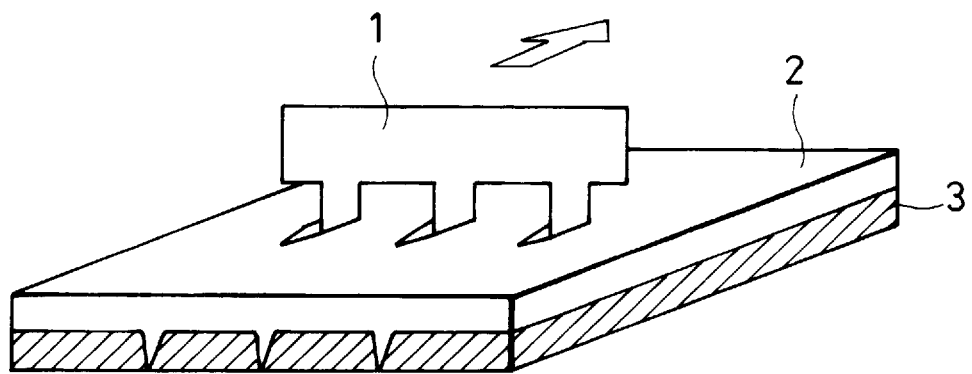
FIG. 1 is a schematic view illustrating the example of the production method of the present invention.

In the process of the present invention, liquid resins which are raw materials of artificial marble are first injected in a molding cell. In this step, liquid resins each having different color are injected to be laminated for providing layered condition. The resin injected in the lowest layer is a liquid resin manifesting base color at the exhibiting surface of a product. For lamination of liquid resins in layered condition, there is a most simple method in which one liquid resin is injected in a molding cell and allowed to stand still, then another liquid resin is injected on the aforesaid resin so that the interface is not disturbed. In the present invention, at least two kinds of resins each having different color are used as the liquid resin. Namely, three or more liquid resins each having different color may be laminated to form a laminated body composed of three or more layers.

It is preferred for controlling the manifestation of a pattern to laminate liquid resins in uniform condition in the whole surface of a molding cell, however, even if there is partial unevenness in the thickness of the lamination, this unevenness does not directly exert an influence on the manifestation of a striped pattern. Though the thickness of each layer of a liquid resin is not particularly restricted, it is preferably from about 2 to 20 mm. In particular, it is not preferable that the thickness of the liquid resin of the lower layer is too thick, since the liquid resin of the upper layer can not easily reach the bottom surface of the molding cell. On the other hand, it is not preferable that the thickness of the liquid resin of the lower layer is too thin, since the pattern is easily disturbed and is not easily controlled and there occur use problems that the thickness of the grinding of the resulted product is restricted, and the like.

Each liquid resin used in the present invention is usually a mixture, and the composition thereof is not particularly restricted. As a representative example, there is exemplified a composition comprising a syrup which is a mixture of a monomer such as a methacrylate and the like with a polymer thereof, a filler, a coloring pigment and a curing catalyst. The examples of the filler include inorganic fillers such as aluminum hydroxide, magnesium hydroxide, calcium hydroxide and the like and organic fillers such as wood powder and the like. The examples of the coloring pigment include titanium oxide and zinc sulfide having white color; iron oxide yellow having yellow color; iron oxide black having black color; iron oxide red having red color; ultramarine blue and phthalocyanine blue having blue color, and the like. The examples of the curing catalyst include tertiary-butyl peroxy maleic acid, benzoyl peroxide, cumene hydroperoxide, tertiary-butyl hydroperoxide, lauroyl peroxide, azobisisobutyronitrile and the like. In addition to these components, there can be added various components conventionally known as an addition component for artificial marble, such as dyes, ultraviolet absorbers, flame retardants, releasing agents, fluidizing agents, thickening agents, polymerization inhibitors, anti-oxidants and the like.

Regarding a liquid resin used, one which has a large influence on the process of the present invention is viscosity of the liquid resin. The viscosity of the liquid resin is preferably from 300 to 5000 cp. When the viscosity is too high or too low, it is often difficult to manifest a striped pattern and control the pattern.

In the present invention, a comb-like tool is moved in liquid resins thus laminated by injection in a molding cell while leading end of the blade of the tool being contacted with the bottom of the molding cell so that the tool combs the liquid resins. In exaggerated expression, when the comb-like tool is moved in the liquid resins, after passing through of the blade of the comb-like tool, the liquid resins are pushed away and a cavity is formed therein and the liquid resin of the upper layer having a different color flows in the cavity. As a result, in the track thought which the blade of the comb-like tool has passed, the liquid resin of the upper layer having a different color reaches the bottom surface of the molding cell, therefore, if the bottom surface is exhibiting surface, a striped pattern is formed in the track through which the blade of the comb-like tool has passed.

This process is schematically shown in FIG. 1. In the present invention, it is necessary that a liquid resin 2 of the upper layer having different color flows in a track through which the blade of a comb-like tool 1 has passed, and when a liquid resin 3 of the lower layer only flows in the track, a striped pattern is not formed. Therefore, it is necessary that a cavity can be formed in the track through which the blade passed. For formation of this cavity, various factors such as viscosity of the liquid resins, moving speed of the comb-like tool 1, shape of the comb-like tool 1 and the like relate to one another, therefore, conditions for successful formation of this cavity can not evenly determined.

The moving speed of the blade of the comb-like tool is important regarding viscosity of the liquid resin. If the moving speed of the blade is too slow, no cavity is formed in the track through which the blade passes, therefore, the liquid resin of the upper layer having different color can not reach the bottom surface of the molding cell, and a striped pattern can not be formed. The moving speed of the comb-like tool is preferably from 1 to 10 cm/s in general. It is usual that the comb-like tool 1 is moved straightly to form a straight striped pattern, however, it is also possible to move the comb-like tool in a meander line to form a meander striped pattern. The comb-like tool 1 can also be moved several times.

It is suitable that the comb-like tool used in the present invention is inactive against the liquid resins and composed of a material having no stickiness, and the examples of the material include metal such as aluminum and the like, organic materials coated with polytetrafluoroethylene, and the like.

Figure 2:
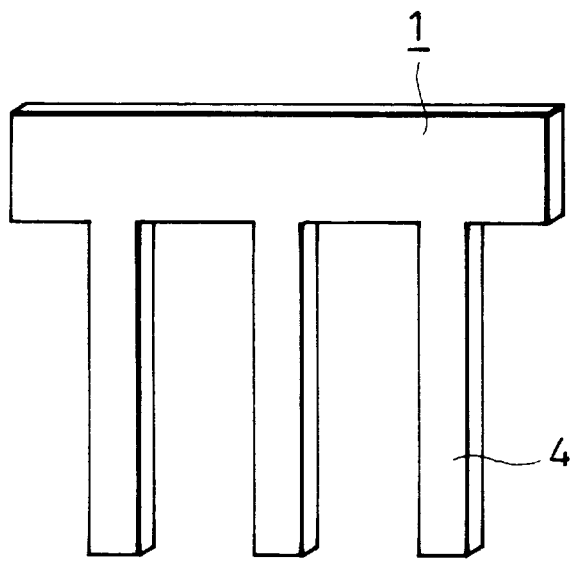
FIG. 2 is a schematic view showing the example of a comb-like tool used in the production process of the present invention.

FIG. 2 is a schematic view of the comb-like tool 1 used in the present invention. Regarding the shape of the blade 4 of the comb-like tool 1, it is suitable that the length of the blade 4 is fully longer than the thickness of the laminated liquid resins so that unnecessary disorder is not caused in the liquid resin of the upper layer. The width (the length perpendicular to the moving direction of the blade) of the blade 4 is preferably from 1 to 20 mm. The width of the blade 4 does not coincide with the width of the striped pattern formed, however, it exerts an influence on the width of the striped pattern. It is recommended that the blade 4 has thickness (the length in the moving direction of the blade) enough to maintain required mechanical strength of the blade, and the thickness does not exerts a large influence on the formation of the striped pattern. It is not suitable that the sectional shape of the blade is streamline shape, and polygonal shape is suitable which causes turbulence in the liquid resin around the track through which the blade has passed. Further, the shape of the leading end of the blade 4 has preferably a flat surface so that the leading end is closely contacted with the bottom surface of the molding cell. The number of the blade 4 may be one, and suitable number of the blade and distance between the blades can be selected depending on a desired striped pattern.

After the comb-like tool is moved, the liquid resins are cured according to a conventional method, and a cured product is took out of the molding cell after curing to obtain artificial marble. In the resulted artificial marble, the surface contacted with the bottom surface of the molding cell has a striped pattern formed. Thus formed striped pattern is a striped pattern of natural line different from that formed by drawing with a ruler, since the pattern is formed based on flow mixing of liquid resins each having different color. Also, there can be produced artificial marble having a straight grain-like pattern if the distance between the blades of the comb-like tool and the number of movement are suitably selected.

In the foregoing description, the process of the present invention is explained with respect to practice in a batch-wise casting method. In a continuous casting molding method, a moving stainless belt to form a molding cell and frames made of rubber, resin and the like placed on both sides of the belt to dam liquid resins are used, therefore, it is also possible that the comb-like tool is fixed for a standstill so that the comb-like tool relatively moves in the liquid resins.

The following example further illustrate the present invention in detail.

Example

A methyl methacrylate syrup (36 parts by weight) composed of 20% by weight of polymethyl methacrylate and 80% by weight of methyl methacrylate, 62 parts by weight of an aluminum hydroxide powder (trade name: BS-33, manufactured by Nippon Light Metal Co., Ltd.), 0.4 parts by weight of ethylene glycol dimethacylate, 0.7 parts by weight of tertiary-butyl peroxy maleic acid and 0.7 parts by weight of titanium oxide were stirred by a mixer, and the resulted mixture was defoamed in a vacuum vessel to obtain a white slurry having a viscosity of 1800 cp. To this white slurry were added 0.1 part by weight of glycol dimercapto acetate and 0.1 part by weight of deionized water and the mixture was stirred, and the resulted mixture was poured in a tray-like frame of 30 cm square so that the thickness was 9 mm. Next, a yellow slurry was prepared in the same manner as for the white slurry except that iron oxide yellow was used instead of titanium oxide, and the resulted yellow slurry was poured in the tray-like frame to laminate a yellow slurry layer having a thickness of 4 mm on the white slurry layer.

On one end of this frame, a comb-like tool in which the width of a blade was 5 mm and the distance between the blades was 25 mm as shown in FIG. 2 made of an aluminum plate having a thickness of 3 mm was immersed, and moved straightly directing to the other end of the frame at a speed of 50 mm/s in the laminated slurries while the blade being contacted with the bottom surface of the molding cell (tray-like frame). Then the slurries were thermally insulated with urethane and allowed to stand for 30 minutes to cure the resins, and a cured article was then took out of the frame to obtain artificial marble having a striped pattern.

The striped pattern of the resulted artificial marble was clear, and even if the surface thereof was ground off by about 0.5 mm, no change occurred in the striped pattern.

What is claimed is:

1. A process for producing artificial marble by curing liquid resins in a molding cell, which comprises a step in which liquid resins each having different color are laminated by injection in the molding cell so that at least two layers are formed, then a comb-like tool is moved in the liquid resins laminated while the blades of the tool are in contact with the bottom of the molding cell to produce a striped pattern formed from at least the liquid resin of a layer which is adjacent a bottom layer and which flows to the bottom of the molding cell, and then the liquid resins are cured to produce artificial marble having a striped pattern.

2. The process for producing artificial marble according to claim 1, wherein the thickness of each layer is from 2 to 20 mm.

3. The process for producing artificial marble according to claim 1, wherein the viscosity of the liquid resins is from 300 to 5000 cp.

4. The process for producing artificial marble according to claim 1, wherein the moving speed of the comb-like tool is from 1 to 10 cm/s.

5. The process for producing artificial marble according to claim 1, wherein the width of the blade of the comb-like tool is from 1 to 20 mm.

* * * * *